US006837018B1

(12) United States Patent
Hagel et al.

(10) Patent No.: US 6,837,018 B1
(45) Date of Patent: Jan. 4, 2005

(54) CONNECTION AND METHOD FOR SETTING A COMPOSITE ANCHOR WITH AN APERTURED SCREEN IN A SUBSTRATE

(75) Inventors: Gerald W. Hagel, Lombard, IL (US); Joel M. Houck, Lansing, IL (US)

(73) Assignee: Simpson Strong-Tie Company, Inc., Dublin, CA (US)

( * ) Notice: Subject to any disclaimer, the term of this patent is extended or adjusted under 35 U.S.C. 154(b) by 0 days.

(21) Appl. No.: 10/459,005

(22) Filed: Jun. 10, 2003

(51) Int. Cl.$^7$ .............................. E04B 1/38; E04C 5/00
(52) U.S. Cl. ......................... 52/698; 411/82; 411/82.1; 411/82.3; 411/258; 411/930; 411/69; 405/259.1; 405/259.5; 52/704
(58) Field of Search ............................ 411/69, 82, 82.1, 411/82.3, 258, 930; 405/259.1, 259.5; 52/704, 698

(56) References Cited

U.S. PATENT DOCUMENTS

| 1,646,457 A | 10/1927 | Ogden |
| 2,092,341 A | 9/1937 | De Vries |
| 2,849,866 A | 9/1958 | Flygare et al. |

(List continued on next page.)

FOREIGN PATENT DOCUMENTS

| AU | 233091 | 3/1961 |
| DE | 131319 | 7/1901 |
| DE | 29 26 155 | 8/1980 |
| EP | 0 287 505 A1 | 10/1988 |
| GB | 2 112 487 A | 7/1983 |
| JP | 60-043522 | 3/1985 |

OTHER PUBLICATIONS

"HIT–S 12 Combi." On–line catalog. Hilti Corp. Schaan, Liechtenstein. Downloaded from the internet at URL: http://www.hilti.com/holcom/modules/prcat/prca_navigation.jsp?OID=–0703. 2002.
"HIT–S Metal Screen Tubes (cuttable)." On–line catalog. Hilti Corp. Schaan, Liechtenstein. Downloaded from the internet at URL: http://www.hilti.com/holcom/modules/prcat/prca. 2002.

Primary Examiner—Carl D. Friedman
Assistant Examiner—Steve Varner
(74) Attorney, Agent, or Firm—James R. Cypher; Charles R. Cypher

(57) ABSTRACT

A connection, and a method of forming a connection, that adhesively fixes and bonds a fastening element or anchor in bore hole, particularly in a soft substrate or substrate with an interior cavity or void where the anchor is to be set in vertical wall or set upwardly into a ceiling. To make the connection, an accessory is used that has the form of a sleeve having a closed or partially blocked insertion end and an open anchor receiving end and apertures running along its length. The accessory helps to ensure that the anchor is surrounded with mortar or adhesive, and the mortar or adhesive contacts the wall of the bore. The cylindrical wall of the sleeve has apertures along its length. The sleeve can be formed with larger apertures formed near the anchor receiving end of the sleeve and smaller apertures formed near the insertion end of the sleeve. The sleeve is formed by inserting an open-ended cylindrical mesh tube into a frame that holds the tube along its length at a select location. This select location can be near the insertion end and away from the anchor receiving end. The sleeve has an external diameter that allows the sleeve to fit into the bore in the substrate and an internal diameter that is large enough to receive the anchor that is to be secured in the bore. The length of the sleeve corresponds or is similar in length to the embedded length of the anchor. The apertures in the peripheral surface of the sleeve create passages therethrough for the uncured adhesive.

35 Claims, 9 Drawing Sheets

U.S. PATENT DOCUMENTS

| | | | |
|---|---|---|---|
| 3,397,498 A | 8/1968 | Murphy | |
| 3,471,183 A | 10/1969 | Fischer | |
| 3,532,316 A | 10/1970 | Mathes | |
| 3,699,687 A | 10/1972 | Bourland | |
| 3,703,790 A | 11/1972 | Mattes et al. | |
| 3,877,235 A | 4/1975 | Hill | |
| 3,901,039 A | 8/1975 | Lundkvist | |
| 4,063,582 A | 12/1977 | Fischer | |
| 4,224,971 A | 9/1980 | Müller et al. | |
| 4,270,331 A | 6/1981 | Lang et al. | |
| 4,430,025 A | 2/1984 | Ciavatta | |
| 4,490,074 A | 12/1984 | Chaiko | |
| 4,528,792 A | 7/1985 | Cross et al. | |
| 4,564,324 A | 1/1986 | Leibhard | |
| 4,620,406 A | 11/1986 | Hügel et al. | |
| 4,773,794 A | 9/1988 | Harke | |
| 4,787,186 A | 11/1988 | Irmscher et al. | |
| 4,790,114 A | 12/1988 | Falco | |
| 4,820,095 A * | 4/1989 | Mraz | 411/82.3 |
| 4,836,729 A * | 6/1989 | Bisping et al. | 411/82.1 |
| 4,899,499 A | 2/1990 | Hoekstra | |
| 4,930,284 A | 6/1990 | Falco | |
| 4,968,185 A | 11/1990 | Leibhard et al. | |
| 4,976,571 A | 12/1990 | Mraz et al. | |
| 5,104,266 A | 4/1992 | Daryoush et al. | |
| 5,249,898 A | 10/1993 | Stepanski et al. | |
| 5,263,804 A | 11/1993 | Ernst et al. | |
| 5,328,300 A | 7/1994 | Fischer et al. | |
| 5,415,507 A | 5/1995 | Janusz et al. | |
| 5,472,296 A | 12/1995 | von Allmen et al. | |
| 5,483,781 A | 1/1996 | Ernst et al. | |
| 5,544,980 A | 8/1996 | Seegmiller | |
| 5,553,436 A | 9/1996 | Kish et al. | |
| 5,632,839 A | 5/1997 | Kish et al. | |
| 5,643,652 A | 7/1997 | Maurer et al. | |
| 5,669,199 A * | 9/1997 | Ludwig et al. | 52/704 |
| RE35,659 E | 11/1997 | Ernst et al. | |
| 5,730,565 A | 3/1998 | Hein et al. | |
| 5,775,850 A | 7/1998 | Gale et al. | |
| 5,888,334 A | 3/1999 | Abraham | |
| 6,457,910 B1 * | 10/2002 | Ludwig et al. | 405/259.1 |
| 6,468,010 B2 * | 10/2002 | Sager et al. | 411/82 |
| 6,705,804 B2 * | 3/2004 | Dierker | 405/259.5 |

* cited by examiner

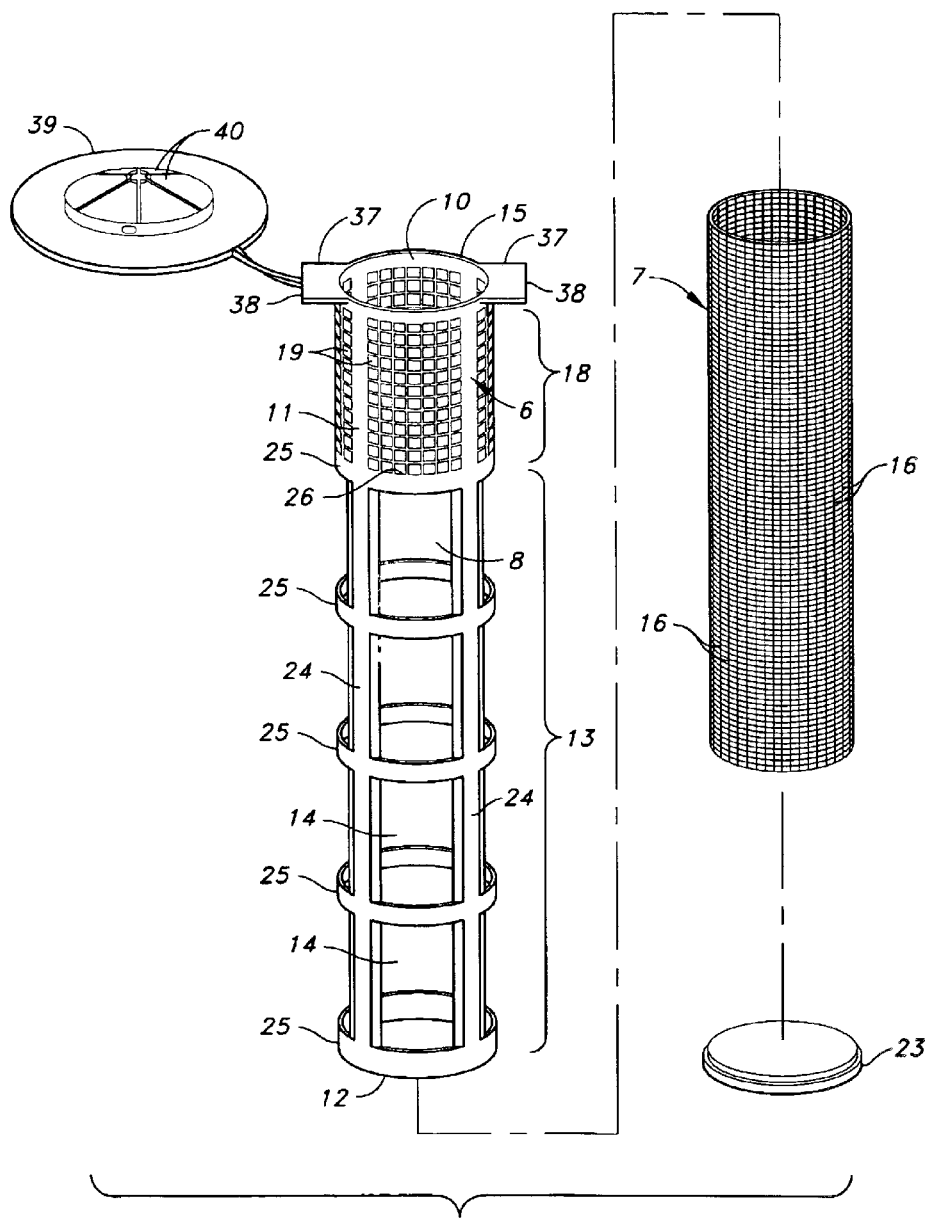
FIG_1

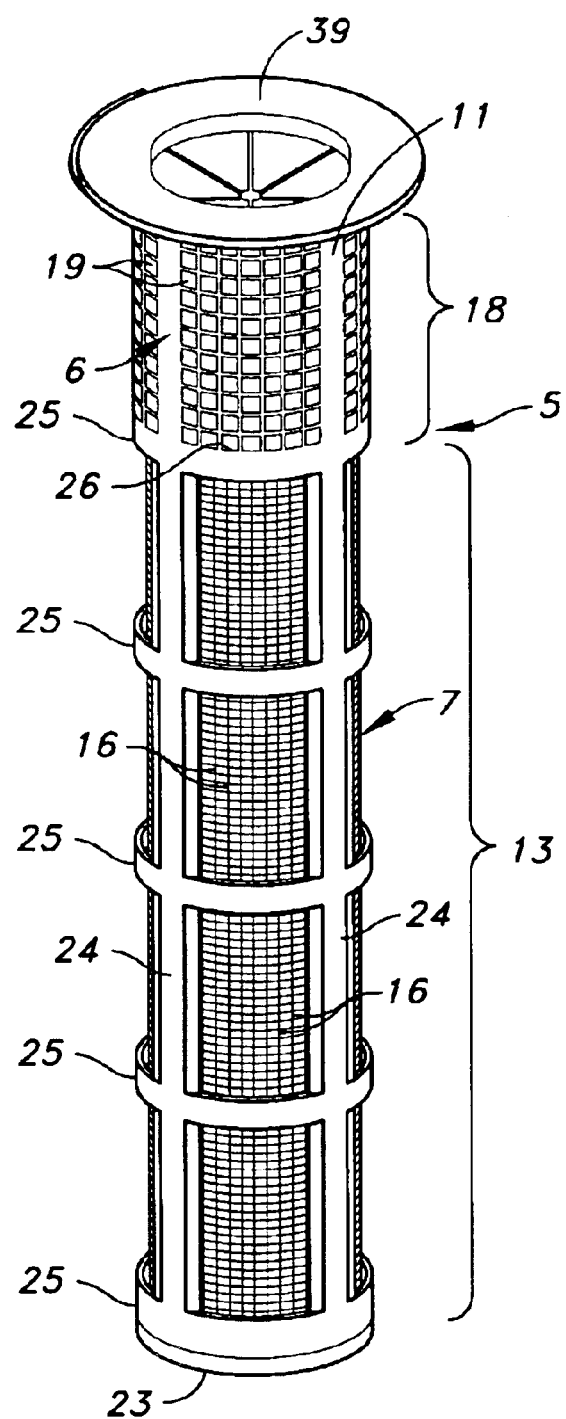
FIG._2

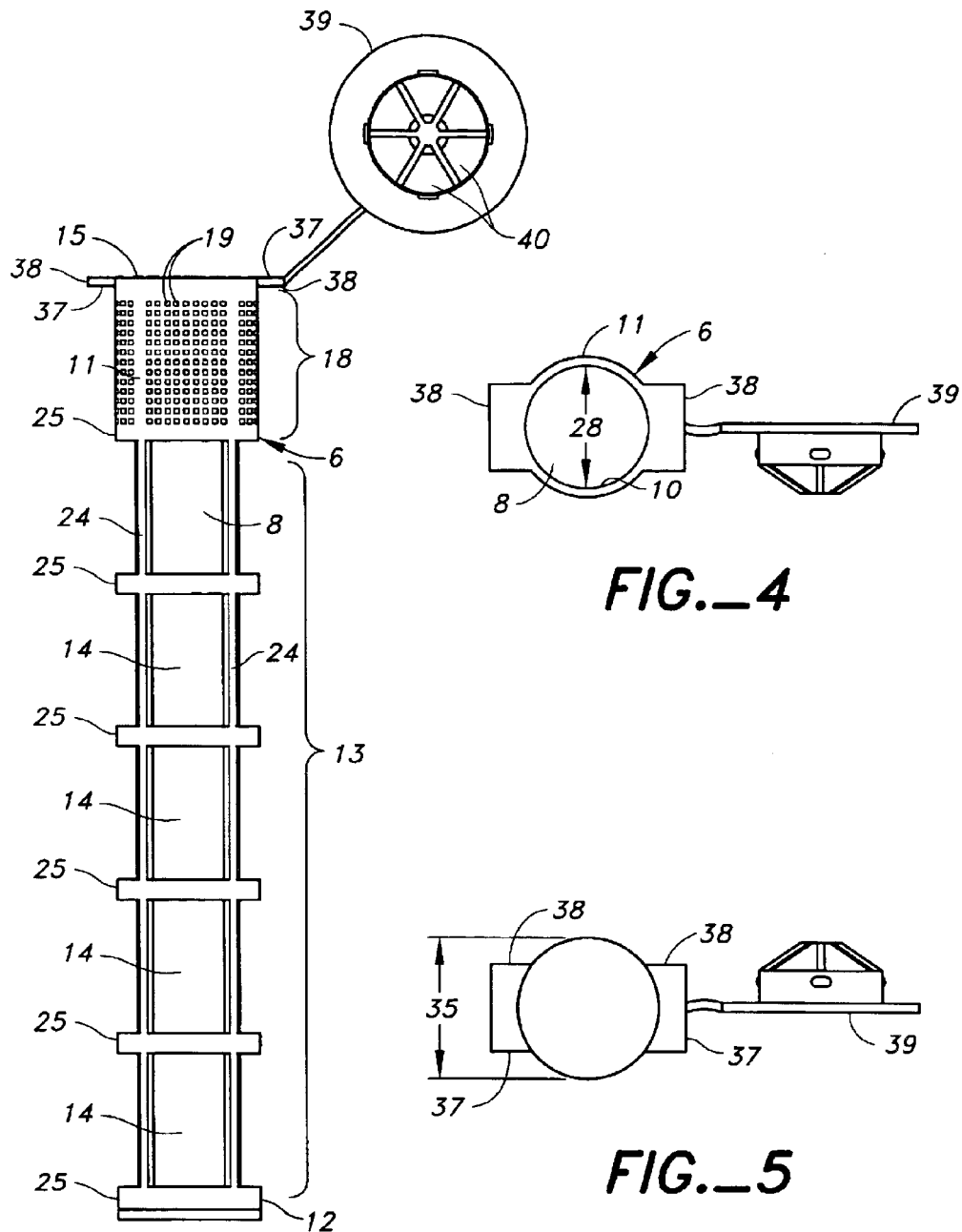

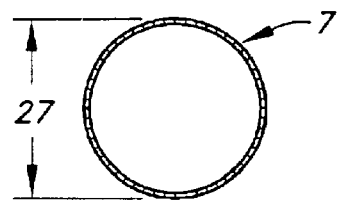
FIG._6A
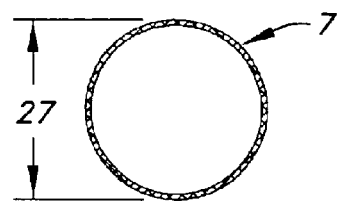
FIG._6B
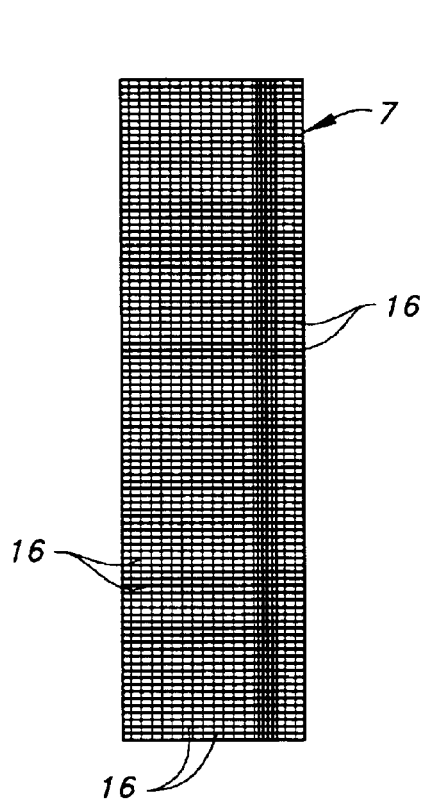
FIG._7A
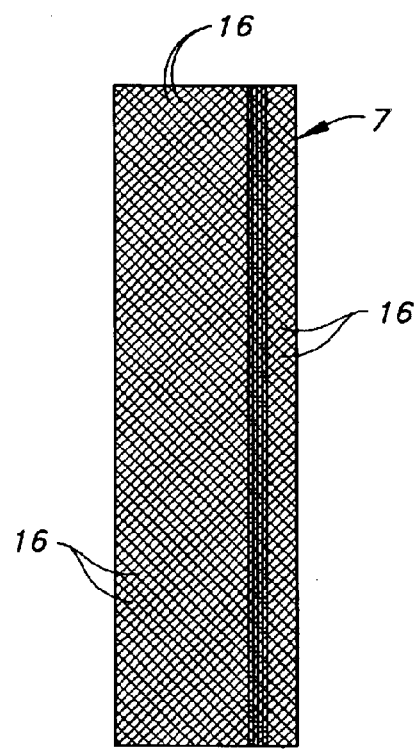
FIG._7B

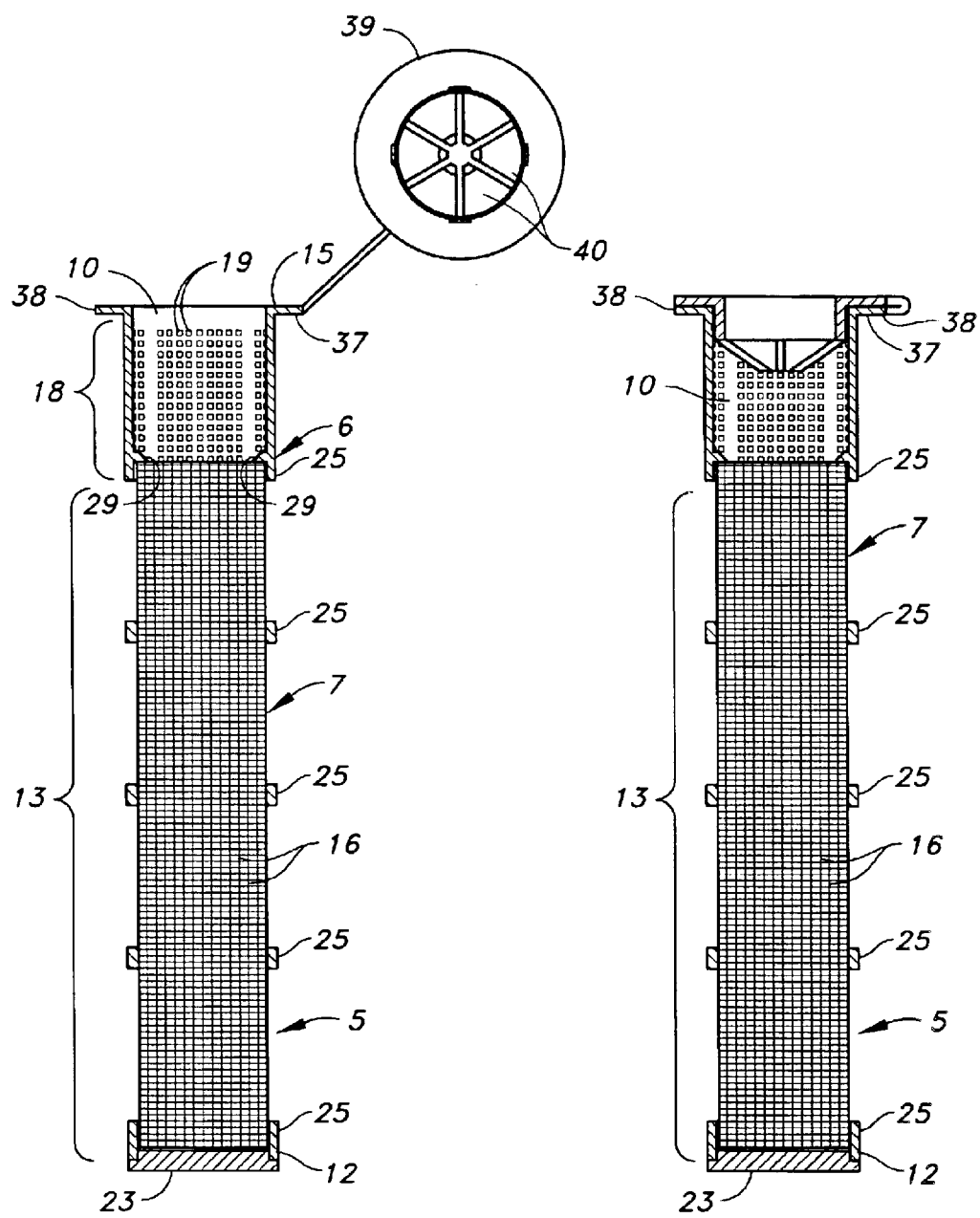
FIG _8A  FIG._8B

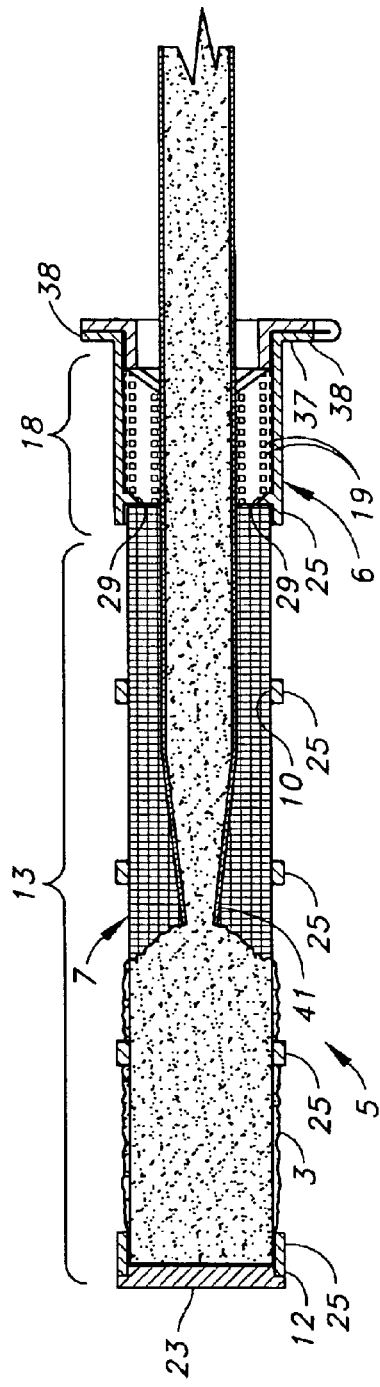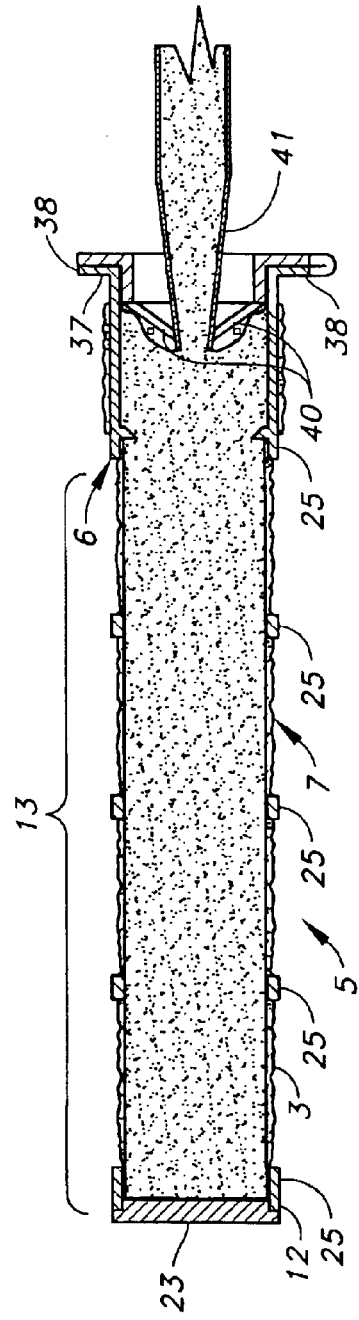

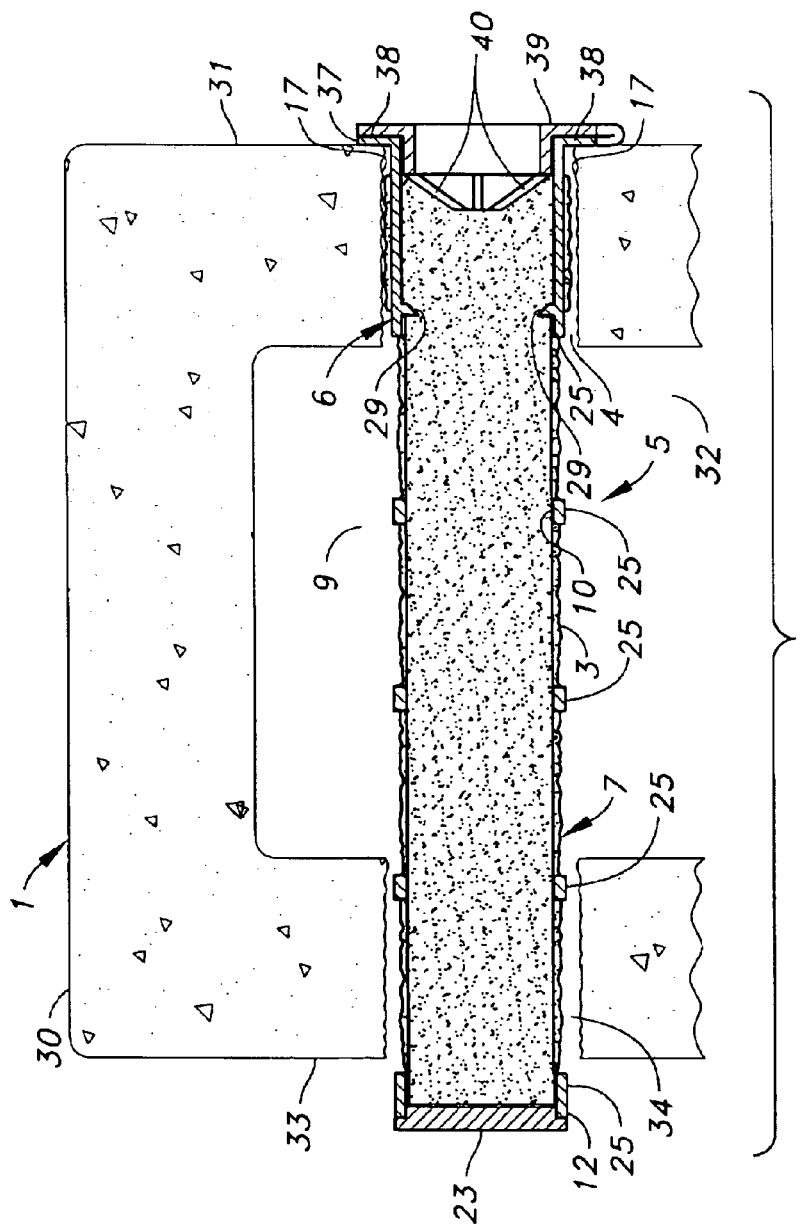
FIG._8E

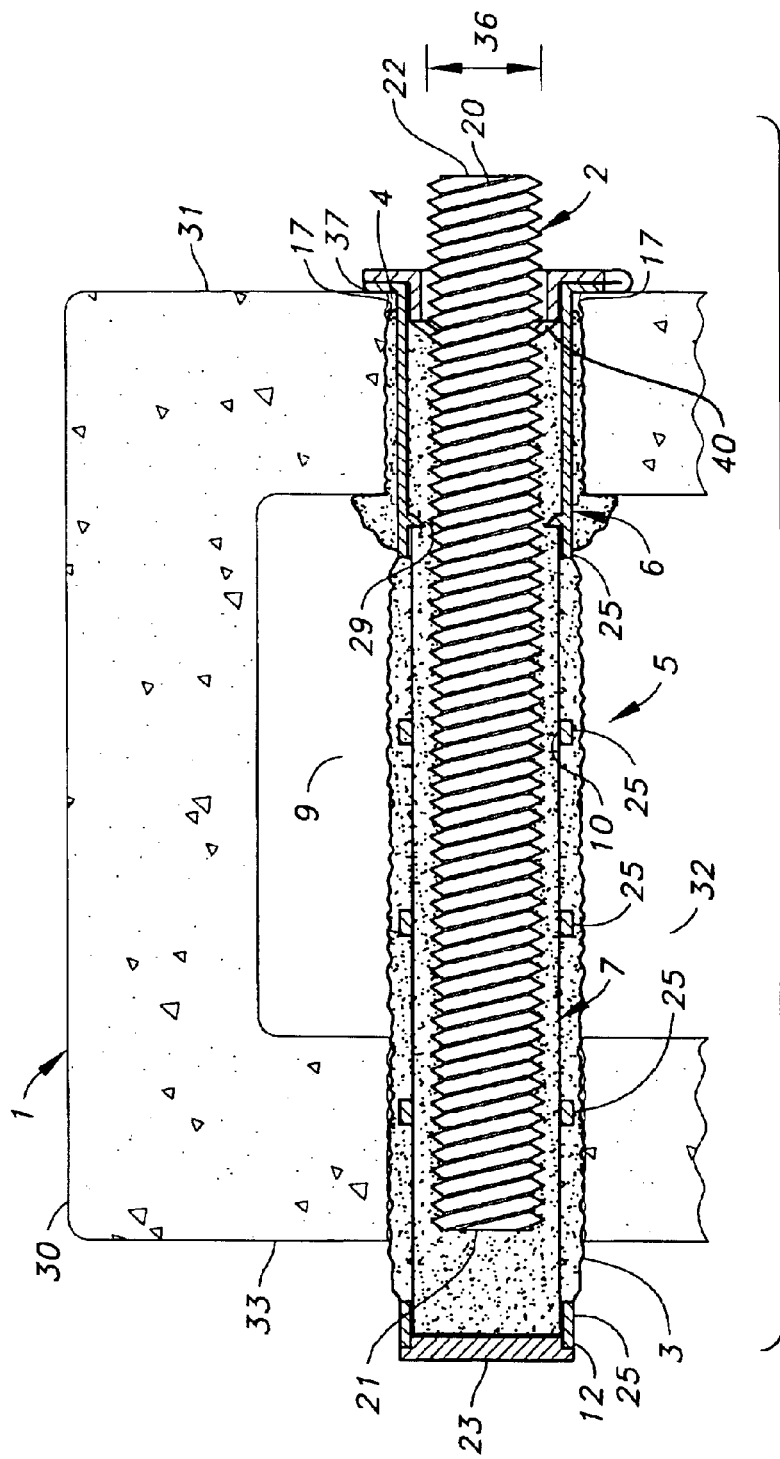
FIG._8F

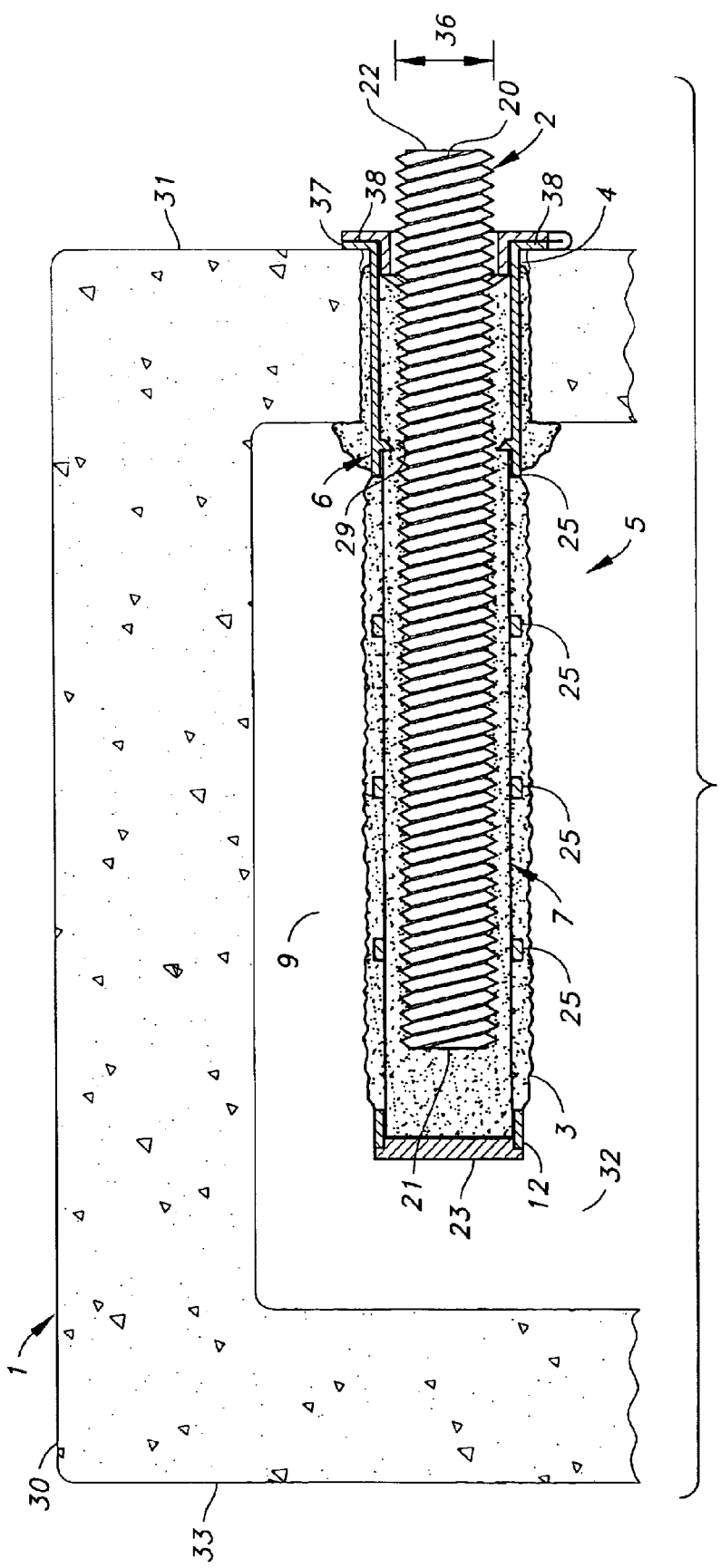

CONNECTION AND METHOD FOR SETTING A COMPOSITE ANCHOR WITH AN APERTURED SCREEN IN A SUBSTRATE

BACKGROUND

The present invention relates to an improved connection between an anchor or fastening element and a substrate, such as masonry, cement or stone, using an adhesive or mortar compound to make the connection, and more particularly, provides an improved apertured or porous sleeve-shaped member for use with the anchor and the adhesive.

It has been found that using an apertured sleeve with an adhesively set anchor (sometimes called a composite anchor) in a bore can improve the connection between the anchor and the substrate in certain situations. Apertured sleeves are useful when the anchor is set in the side face of a wall or upwardly into the bottom face of a ceiling. Typically, the anchor used with an apertured sleeve is a threaded steel rod, although any post of any material can be used. Other anchors that may be used include rebar and tubular steel.

When using an adhesive or mortar to set an anchor in a bore, it is important that the anchor be completely surrounded by the adhesive or mortar and that the adhesive or mortar completely fill the space between the anchor and the wall of the bore, such that there are no air pockets. This creates a strong bond between the anchor and the substrate and protects the anchor from corrosion. This condition is generally easily achieved without the use of an apertured sleeve, when the bore is made in a foundation or floor and the adhesive is inserted into the bore from above. The adhesive flows easily to the bottom of the bore, and when the bottom of the bore is reached, it starts to fill the bore, spreading circumferentially to the wall of the bore, generally a cylinder. However, injecting adhesive so as to sufficiently fill a bore when the bore is disposed horizontally, as in a wall, or upwardly, as in a ceiling, can be very difficult.

Apertured sleeves assist with the placement of the adhesive in these situations in a number of ways. They help measure how much adhesive needs to be used with an anchor of selected dimensions, and they help the adhesive to reach the upper surfaces of the bore, and keep the adhesive relatively close to the anchor.

Measurement of the adhesive is achieved by first selecting the length of the sleeve so that it is only slightly longer than that part of the anchor that will be embedded in the substrate. Second, measurement is achieved by closing the end of the sleeve that is inserted into the bore, although it may have apertures like the rest of the sleeve. Generally, the apertured cylindrical sleeve also has a diameter smaller than that of the bore, and larger than that of the anchor. Generally, the sleeve is small enough to slip easily into the bore and large enough to slip easily over the anchor. The apertures in the sleeve are dimensioned to work with particular adhesives. The apertures need to allow uncured adhesive to flow through them when forced under pressure, as when an anchor is inserted into a sleeve filled with adhesive, but also need to slow the flow of adhesive that is merely being inserted in the sleeve during a filling operation. The apertures also need to be spaced sufficiently close so that the adhesive will substantially cover the sleeve where it can escape from the sleeve through the apertures.

With a sleeve formed in this fashion, it is a simple matter to fill or charge the sleeve with adhesives outside of the bore, and then insert the sleeve into the bore. In this manner, an appropriate amount of adhesive is delivered into the bore for a particular anchor. Because the inserted end of the sleeve is closed or partially blocked, the adhesive does not easily flow further into the bore, and if an anchor is inserted quickly into the sleeve and the bore, there will be little opportunity for the adhesive to flow back out of the front opening of the bore. Thus a selected amount of adhesive is collected and situated in the bore and prevented from flowing away from the anchor, and thus will uniformly spread and surround the anchor, filling the clearance or space between the wall of the bore and the outer surface of the anchor, creating a strong connection between the substrate and the anchor along its entire length.

Apertured sleeves are also especially useful when the anchor is set in a hollow substrate or a substrate with an internal open space or spaces such as concrete block or concrete masonry units (CMU). The screen-type sleeve serves to keep the hardenable mass close to the anchor.

Concrete blocks are generally cement and/or concrete formed into rectangular cells. Concrete blocks and concrete masonry units are hollow rather than solid rectangular blocks. A typical concrete block or CMU is generally a rectangular block with 4 full sides or shells surrounding a cavity that opens outwardly through the top and bottom surfaces. Wider concrete blocks and concrete masonry units may be formed with a web that divides the cavity and spans the distance from one side of the block to the other. The walls of the concrete block or CMU can be narrow or thicken depending on the strength needed for the block.

Setting an anchor in a substrate having interior voids such as a concrete block wall or in a masonry wall having an air space between a facade of bricks and the concrete supporting wall creates further difficulties for the insertion of adhesives. Not only can the adhesive flow too far into the bore away from the anchor, and drip down from the upper surfaces of the bore, but it can literally fall into the void completely away from the anchor.

Since it is likely that void in the wall or the cavity in the concrete block is too large for there to be any bonding of the anchor to the substrate by means of the adhesive along substantial portions of its length, the attachment of the portions of the anchor situated in the bore in the wall or shell of the concrete block or the lines of masonry units becomes very crucial. As mentioned above, the apertured sleeve helps distribute the adhesive uniformly around the anchor making sure that as much contact with the masonry substrate is achieved as is possible. Also the apertured sleeve helps protect the anchor from the elements by keeping it surrounded with adhesive, even in portions of the substrate where there is a large cavity and no bond can be created between the substrate and the anchor.

Setting an anchor in a substrate with a void or hollow interior area also creates additional difficulties for creating a strong connection that the current invention seeks to address. With substrates that have voids, it is especially important that a strong bond be made between the substrate and the anchor where that bond is possible. One way of increasing the chance that enough adhesive will fill the space between the anchor and the substrate is to direct the adhesive through various areas of the sleeve along its axial length where the substrate is expected to be by increasing the aperature size or the porosity of the sleeve in those areas with respect to the aperture size in other areas. Thus in the areas with larger aperture size the adhesive will more easily flow through the sleeve and is more likely to reach the substrate.

According to U.S. Pat. No. 4,790,114, granted to Gene Falco, when an anchor exerts ram pressure on an adhesive within a sleeve with a uniform porosity over their axial length more adhesive is pushed radially outward from the sleeve at the distal or insertion end than is extruded from the insertion or proximal end, resulting in a conically tapering displacement of adhesive with the base of the cone being at the distal or insertion end. See U.S. Pat. No. 4,790,114 at column 1, line 34 through 57. According to Falco, "the [adhesive] material moves freely and uniformly toward the leading edge rather than in a significantly radially [sp] direction through the sleeve."

To combat this problem, Falco in U.S. Pat. No. 4,790,114 teaches a sleeve with an axial section at the trailing end of the screen with a mesh size that is larger than the mesh size of an axial section at the leading end of the screen. The larger mesh size at the trailing end means less resistance to radial extrusion of the adhesive, and, thus, less ram pressure is needed to push adhesive radially outward through the screen, so that enough adhesive will exit the screen at the trailing section and is thus likely to reach the peripheral wall of the bore and bond with the anchor with the substrate, creating a stronger connection.

Falco in U.S. Pat. No. 4,790,114 achieves a screen with two different mesh sizes by bonding two different tubes of two different mesh sizes with a lapping seam and welding, braising or otherwise joining them together.

This is a labor intensive operation that does not lend itself well to automation and insuring quality control through a run of parts. There exists a need in the art to create a sleeve with axial sections having different resitances to radial extrusion of the adhesive that is cost effective to produce and can insure unform quality among parts.

The object of the present invention is to provide a composite anchor capable of being mass produced at a reasonable price, as well as a composite anchor which is easy to handle and has a high resistance to extraction.

OBJECTS OF THE INVENTION

It is an object of the present invention to improve the adhesive setting of anchors in substrates, and to ensure the creation of a dependable, strong and safe bond between the anchor and the substrate.

It is an object of the present invention to create a connection between an anchor and a substrate by means of a sleeve formed from two separate and distinct members: a cylindrical frame and a tube, both having apertures or openings.

It is a further object of the present invention to create an apertured or perforated sleeve, having different aperture dimensions at different areas along its length that is economical to produce.

It is a further object of the present invention to create an apertured or perforated sleeve that cannot be pushed too deeply into a bore.

It is a further object of the present invention to provide an accessory sleeve that is divided along its axial length into at least two axial sections, in one section of which perforations are provided, in total, having a path of less resistance to radial extrusion than in the other section, thus enabling selection of relatively different amounts of adhesive material to be extruded from the selected axial sections. Preferably, the axial section with the least resistance to radial extrusion is located at the trailing or proximal end of the sleeve where the initial ram action occurs.

The sleeve achieves two axial sections each with a different resistance to radial extrusion or with a different porosity by forming a frame that receives a mesh tube only along part of its length. The mesh tube has a given porosity along its length. The frame, where it receives the mesh tube, has very large openings between staves and connecting ribs, such that the except where the ribs of the frame overlie the mesh tube, the mesh tube determines the rate at which the adhesive is radially extruded. Meanwhile the frame in the axial portion where it does not overlie the mesh tube has apertures formed in it that are a, different porosity than that of the mesh tube. These apertures determine the radial flow of adhesive through the sleeve, thus producing a different rate of radial extrusion from the mesh tube.

According to the present invention, there may be any number of different axial sections each with a different resistance to extrusion of the adhesive, some even without openings. The preferred embodiment is designed to effectively have two axial sections with different radial extrusion rates.

It is also an object of the present invention to provide an improved method of setting an anchor with an apertured sleeve and an adhesive in a substrate. According to the improved method an apertured screen is created by inserting a separately formed tube into a separately formed frame. The wall of the tube has apertures formed therein. The frame has a first axial section having openings therein. The tube is inserted into the frame in such a manner that the apertures in the tube overlap with the openings in the first axial section of the frame. The screen is filled with adhesive. The screen is inserted into a bore in the substrate. An anchor is inserted into the screen after the screen has been filled with adhesive and after the screen has been inserted into the bore, such that the adhesive is extruded out of the screen through the apertures in the separately formed tube and the openings in the separately formed frame, such that the adhesive contacts the bore of the substrate.

BRIEF DESCRIPTION OF THE DRAWINGS

FIG. 1 is a perspective view of the individual frame, tube and plug of the present invention before they are assembled to create the sleeve.

FIG. 2 is a perspective view of the sleeve of the present invention with the cap attached to the anchor receiving end of the frame.

FIG. 3 is a front view of the frame of the present invention with the plug attached to the insertion end of the frame. The tube has not been inserted into the frame.

FIG. 4 is a top view of the frame of FIG. 3.

FIG. 5 is a bottom view of the frame of FIG. 3.

FIG. 6A is an end view of the mesh tube.

FIG. 6B is an end view of an alternate mesh tube.

FIG. 7A is a front view of a mesh tube.

FIG. 7B is a front view of an alternate mesh tube.

FIG. 8A is a sectional front view of the sleeve of the present invention.

FIG. 8B is a sectional front view of the sleeve of the present invention with the cap attached to the anchor receiving end of the frame.

FIG. 8C is a sectional front view of the sleeve of the present invention being filled with adhesive, according to the method of the present invention.

FIG. 8D is a sectional front view of the sleeve of the present invention being filled with adhesive, according to the method of the present invention.

FIG. 8E is a sectional front view of the sleeve of the present invention filled with adhesive and inserted through two oppositely disposed shells of a into a hollow concrete masonry unit.

FIG. 8F is a sectional front view of the sleeve of the present invention filled with adhesive and inserted through two oppositely disposed shells of a hollow concrete masonry unit, having received an anchor so that the adhesive is forced out of the apertures in the sleeve to bond with the shells of the concrete masonry unit.

FIG. 9 is a sectional front view of the sleeve of the present invention filled with adhesive and inserted through one shell of a hollow concrete masonry unit, having received an anchor so that the adhesive is forced out of the apertures in the sleeve to bond with the shell of the concrete masonry unit.

DESCRIPTION OF THE PREFERRED EMBODIMENT

As shown in FIG. 8F, the present invention relates to a connection, and a method of forming a connection, between a substrate 1 and an anchor 2 by means of adhesive 3. The substrate 1 is formed with a bore 4 therein. To facilitate the connection between the anchor 2 and the substrate 1 a special porous sleeve 5 is used.

The sleeve 5 is received by the bore 4 in the substrate 1. As shown best in FIG. 1, the sleeve 5 is formed from two distinct and separately formed members: a frame 6 and a tube 7. The two individual members 6 and 7 are assembled together to create the sleeve 5 for the connection.

The first member is a frame 6 that defines an interior area 8 enclosed by the frame 6, see FIGS. 3 and 4, and an exterior area 9, see FIG. 8F. As shown in FIG. 4, the frame 6 has an internal surface 10 and an external surface 11. The frame 6 is preferably cylindrical.

As shown in FIG. 3, the frame 6 can be considered to have a number of different portions. The end of the frame 6 that is inserted first into the bore is called the distal or insertion end 12. In the preferred embodiment, directly following the insertion end 12 is the first or leading axial section 13, although the leading axial section 13, as defined, does not need to directly follow the insertion end 12 to be able practice the invention. The first axial section 13 of the frame 6 is formed with openings 14 therein. The end of the frame 6 that will be visible when the sleeve 5 is inserted into the bore 4 is called the trailing or anchor receiving end 15.

As shown in FIGS. 7A and 7B, the second distinct and separate member is a tube 7 having apertures 16 formed therein. The tube 7 is preferably cylindrical.

As shown in FIGS. 1 and, 2, to create the connection, the tube 7 is received by the frame 6, such that at least a portion of the tube 7 overlaps a portion of the leading axial section 13. Because there are openings 14 in the leading axial section 13 and apertures 16 in the tube 7, a fluid material disposed within the interior area 8 enclosed by frame 6 and at the leading axial section 13 could be forced radially outwardly through the apertures 16 in the cylindrical tube 7, and through the openings 14 in the leading axial section 13 of the frame 6 to reach the exterior 9 of the frame 6. In fact, as shown in FIG. 8F, to make the connection, an adhesive 3 is disposed within the interior area 8 of the frame 6 and due to the insertion of the anchor 2 into the sleeve 5 before the adhesive 3 has set, the adhesive 3 is forced out of the frame 6 through the apertures 16 in the tube 7 and the openings 14 in the leading axial section 13 of the frame 6.

The adhesive 3 is also disposed along portions of the exterior area 9 of the frame 6, and in contact with the bore 4 in the substrate 1. Preferably, the adhesive 3 is extruded out of the sleeve 5 and into contact with the bore 4 in the substrate 1 by operation of the insertion of the anchor 2 into the sleeve 5. The anchor 2 through contact with the adhesive 3 becomes bonded to the substrate 1 when the adhesive 3 sets.

In the preferred form of the connection, the adhesive 3 completely surrounds and is in complete contact with the portion of the anchor 2 inserted into the frame 6. Similarly, where there are openings 14 in the frame 6, the adhesive surrounds the portion of the sleeve 5 inserted into the bore 4 in the substrate 1. Thus, the adhesive 3 substantially surrounds and contacts the interior and exterior surfaces 10 and 11 of the frame 6, pervades the apertures 16 in the tube 7 and the openings 14 in the leading axial section 13 of the frame 6, and bonds with the walls 17 of the bore 4.

As shown in FIGS. 1 and 2, in the preferred form of the sleeve 5, the frame 6 is further formed with a second axial section 18. The second axial section 18 has openings 19 formed therein. Preferably, the second axial section 18 follows the leading axial section 13, thus it is also called the trailing axial section 18, i.e. it is disposed between the leading axial section 13 and the anchor receiving end 15 of the frame 6. Preferably, the openings 19 formed in the trailing axial section 18 are of a different size than the openings 14 formed in the first axial section 13, and the apertures 16 in the tube 7.

The anchor 2 or fastener can be a rod, bolt, dowel, post, bar, rebar, pin or some other elongated member. The anchor 2 can be smooth, threaded, or have some other surface contour. As shown in FIG. 8F, the preferred anchor 2 is an all thread rod, having threads 20. The anchor 2 can have similar leading and trailing ends 21 and 22, respectively, as shown in FIG. 8F, or the trailing end 22 that juts out from the substrate 1 could be formed with a hook or some other-shape to enable it to be used as a special purpose support for something to be hung from the anchor 2.

The anchor or fastener 2 is preferably made of metal, such as steel, but the particular material can vary so long as the desired load characteristics are achieved. The anchor 2 could be made from a fiber composite, a plastic, a ceramic or wood.

The preferred sleeve 5 is an axially extending generally cylindrical hollow body.

The sleeve 5 can be of any length, depending on the anchor 2 and bore 4 with which it will be used.

As is best shown in FIGS. 1 and 2, in the preferred embodiment, the sleeve 5 is formed from at least two separate and physically distinct pieces that are combined together to form the final sleeve 5. In the preferred embodiment the sleeve 5 is made up of at least a cylindrical frame 6, and a separate mesh tube 7 that are assembled together.

In the preferred embodiment, the frame 6 has an insertion end 12, a leading axial section 13, a trailing axial section 18, and an anchor receiving end 15.

As is shown in FIG. 1, in the preferred embodiment, the insertion end 12 of the frame 6 is open, and receives a plug 23 that will completely close off the insertion end 12 of the frame 6, once the mesh tube 7 has been received in the frame 6. In the preferred embodiment, when the sleeve 5 is ready to be inserted in the bore 4 in the substrate and be filled with adhesive 3, the insertion end 12 of the frame 6 is substantially closed or sealed so that the adhesive 3 in the interior 8 of the frame 6 cannot pass through the insertion end 12 of the frame 6 to reach the exterior 9 of the frame 6.

As is shown in FIGS. 1, 2 and 3, in the preferred embodiment, the leading axial section 13 of the frame 6 has a plurality of spaced-apart staves 24 running from the insertion end 12 to the trailing axial section 18, joined together at points along the length of the frame 6 by ribs 25. The ribs 25 are preferably annular hoops. The openings 14 in the leading axial section 13 are created between the spaced-apart staves 24 and the ribs 25.

In the preferred embodiment, these openings 14 in the leading axial section of the frame 6 are relatively large compared to the apertures 16 in the tube 7.

In the preferred embodiment, the spaced-apart staves 24 that extend axially along the frame 6 are joined by ribs 25 at the ends of the staves 24 and at intervals along the staves 24.

In the preferred embodiment, as shown in FIG. 1, the preferred frame has four staves 24. The preferred embodiment has at least one annular rib 15 spaced between the insertion end 12 and the trailing axial section 18, and more depending on the length of the sleeve 5.

In the preferred embodiment, the trailing axial section 18 is also cylindrical, but instead of having large open areas, it has a plurality of small apertures or openings 19.

As is shown in FIG. 1, in the preferred embodiment, the apertures are laid-out in a rectangular grid as shown in FIG. 1. The preferred openings 19 are square openings. As is best shown in FIG. 3, in one embodiment, the sides 26 that define the square openings 19 are 0.038" long, and are separated by members that are 0.030" wide.

In the preferred embodiment, after the trailing axial section 18, the sleeve 5 ends at the anchor receiving end 15.

The other separate member of the preferred multi-component sleeve is the mesh tube 7.

The mesh tube 7 is preferably formed from a synthetic fabric or mesh netting, preferably nylon, or some other material such as polyester, polypropylene, polyethylene or some other thermal formed material. The mesh tube 7 could also be formed from a perforated plastic or metal sheet.

The mesh tube 7 is preferably made by cutting a strip from stock mesh netting. The strip of mesh netting is then rolled about its longitudinal axis and secured to itself at one or more locations or, preferably, along its entire length by an adhesive, hot melt, heat or ultrasonic welding, as is shown in FIGS. 7a and 7b. Preferably, there is very little overlap when the mesh is rolled on itself. Alternatively, the mesh tube can be manufactured in a continuous operation.

The apertures 16 of a select size in the mesh tube 7 are preferably uniformly distributed over the surface of the tube 7. The size of the apertures 16 or mesh count of the mesh tube 7 will depend on the adhesive or mortar to be used. The inventors have found that a mesh tube 7 with a mesh count of 30 per inch and an open area of 22% is the preferred mesh for use with an adhesive product sold under the mark Acrylic-Tie™ by Simpson Strong-Tie Company, Inc., the assignee of the present invention. The mesh tubes shown in FIGS. 7A and 7B show alternate orientations of the preferred rectangular mesh.

As shown in FIGS. 4, 6A, 6B and 8A, the mesh tube 7 is inserted into the frame 6. Preferably, the mesh tube 7 has an outer diameter 27 that closely matches the interior diameter 28 of leading axial section 13 of the frame 6.

The sleeve 5 is manufactured by separately forming the frame 6 and the mesh tube 7, and then inserting the mesh tube 7 into the frame 6.

The mesh tube 7 is preferably inserted through the insertion end 12 of the frame 6.

As shown in FIG. 8A, in the preferred embodiment, the internal surface 10 of the frame 6 is preferably formed with a plurality of shoulders 29 at the beginning of the trailing axial section 18 of the frame. The mesh tube 7 is preferably the length of the leading axial section of the frame 13, and when it is inserted fully into the frame 6, and stopped by the shoulders 29 on the inner diameter 28 of the frame 6 it does not protrude from the insertion end 12 of the frame 6.

In the preferred method of making the sleeve 5, a plug 23 is then attached to the insertion end 12 of the frame 6 by sonic or heat welding, trapping the mesh tube 7 in the frame 6 between the shoulders 29 and the plug 23.

As shown in FIG. 2, in the preferred embodiment, once the mesh tube 7 is inserted within the frame 6, the screen 5 is provided with relatively small apertures 16 and 19 substantially along the whole of its length.

In the preferred embodiment, the sleeve 5 has a greater open area or higher porosity at its rear or trailing axial section 18 than at its forward or leading axial section 13 to allow for selectively higher rates of radial extrusion of the adhesive 3 at the rear of the sleeve 5. The porosity could be reversed, the rear section could have no pores at all, or the length of the screen 5 could be divided in more than just two segments of differing porosity. More than one mesh tube 7 could be received by the sleeve, and where a plurality of mesh tubes 7 are used, the porosity of the mesh tubes 7 could vary. Tubes could also be inserted in the frame that do not have apertures.

The use of a frame 6 that receives one or more mesh tubes 7 allows for a simple means to create a sleeve 5 with varying porosity or resistance to radial extrusion of a fluid material out of the sleeve 5 under ram action along various segments of the sleeve 5.

As shown in FIGS. 8E and 9, in the preferred embodiment of the sleeve 5 designed for use with concrete masonry units 30 having thin webs 31 or shells, the trailing axial section 18, having less resistance to radial extrusion of the adhesive 3, does not extend too far along the sleeve 5. The trailing axial section 18 is preferably, approximately the depth of the web 31 or shell when the sleeve 6 is used in a hollow concrete masonry unit 30 or other substrate 1 having an initial web 31 and then a large cavity 32.

The sleeve 5 is made of a relatively stiff but resilient material. The material may be metal, but it is preferably made from plastic. The cylindrical frame 6 is preferably made of polypropylene, polyethylene, nylon, polyester, polyurethane, ABS plastic or any similar thermal formed material.

As is shown in FIG. 8F, the material of the frame 5 is stiff enough to enable the elongate sleeve or screen 6, even when it is filled with mortar or some other adhesive 3, to bridge a void or cavity 32 in a hollow substrate 1 such as concrete masonry unit 30. Longer screens 3 meant to span long voids 32 will need to be made from very stiff material; however, the inventors contemplate that typical screens will be from 3.5" to 8" long, and these can be made from polypropylene or polyethylene.

As shown in FIGS. 8E and 8F, when used in a concrete masonry unit or hollow block 30, and the uses desires to set the anchor in both the first web 31 and the second web 33 of the concrete masonry unit 30, the screen 5 needs to be stiff enough, when filled with mortar 3 to be inserted into a first bore or tunnel 4 formed in a first web 31 of a hollow block 30, extend across an interior cavity 32 of the hollow block 30 and be received in second aperture formed in the second opposite web 33 of the hollow block 30. During the insertion, the user will not be able to see the second aperture 34 formed in the second opposite web 33 of the hollow block 30.

Preferably, the screen 5 has a generally uniform diameter along its length. As shown in FIGS. 5 and 8E, the screen has an outer diameter 35 selected to cooperate with the diameter of the bore 4 or aperture in the substrate 1 or the first and second bores or apertures 4 and 34 in the first and second webs 31 and 33 of a hollow substrate 30. As shown in FIGS. 4 and 8F, the effective inner diameter of the sleeve 28 is selected to cooperate with the external diameter 36 of the anchor 2.

The insertion or distal end 12 of the frame 6 is preferably closed or substantially closed so that the uncured adhesive 3 is prevented from leaving the intended zone of adhesive bonding. When a fastener or anchor 2 is inserted into the cylindrical screen 5, the adhesive 3 disposed within the screen 5 will be prevented from being axially discharged from the distal end 12 of the sleeve 5, and will be discharged radially through the apertures and openings 14, 16 and 19 in the sleeve 5.

As shown in FIG. 8F, the frame 6 is preferably formed with an abutment 37 at its anchor receiving or proximal end 15 which determines the depth to which the sleeve 5 can be driven or inserted into the hole 4. This abutment or stop 37 may be formed by providing an annular flange at the anchor receiving end 15, or as is shown in FIG. 1, in the preferred embodiment, a pair of oppositely disposed flanges 38 at the anchor receiving end 15 of the frame 6.

As is shown in FIG. 1, a cap 39 is preferably formed integral with the proximal end 15 of the frame 6. The cap 39 is formed with resilient flaps 40 so that when it is attached to the frame 6, an anchor or fastener 2 may still be inserted into the sleeve 6. The cap 39 with flaps 40 helps prevent the adhesive 3 from being extruded out of the sleeve 5 through the proximal end 15 when the anchor 2 is inserted into the sleeve 5.

The substrate 1 is preferably masonry or concrete. The substrate could also be rock, metal, plastic, a composite or some other material.

The bore 4 in the substrate 1 or apertures 4 and 34 in the webs 31 and 33, if a hollow substrate 30 is used, are generally cylindrical tunnels with a peripheral/cylindrical wall 17. The bore 4 can be a blind tunnel. The bore 4 can also be a through-hole or aperture if the bore is formed in the first web 31 of a substrate 1 having a hollow interior 32, such as with concrete masonry units 30. If the substrate 1 is soft, or porous, the peripheral wall 17 of the bore 4 may have large cavities.

A typical hollow substrate 1 is a wall of a building made up of concrete masonry units 30. Concrete masonry units 30 typically come in widths of 6", 8", 10" and 12". They come in different weights. The face shell or webs 31 and 33 of the concrete masonry 30 unit get thicker as the width of the concrete masonry unit gets larger.

The inventors have designed selected screens 5 for use with concrete masonry units 30 of different sizes. The inventors have found that a nominal 3.5" length screen is optimally used with a 6" concrete masonry unit for insertion into only the front web or shell 31 of the concrete masonry unit 30.

With respect to the adhesive 3, preferably, the apertures 16 in the mesh tube 7 and the openings 19 in the second axial section 18 are designed to be used with a specific adhesive or hardenable mass 3. The characteristics of the adhesive 3 determine the size of the apertures 16 of the mesh tube 7 and the size of the apertures 19 in the second axial section 18 of the frame 6. These characteristics include viscosity and the particle size of the filler in the adhesive 3. Preferably, the aperture sizes are chosen for a specific adhesive compound 3 so that the adhesive 3 does not flow or just barely flows through the screen 5 when initially injected into the screen before insertion into the apertures or bore 4, due to the viscosity of the adhesive 3. The consistency of the adhesive 3 and the dimensions of the relatively small apertures 16 and 19 of the sleeve 5 should be so interrelated that the mortar 3 can only barely flow out of the sleeve 5 by itself when initially injected into the sleeve 5, but can be forced out through the apertures 16 and 19 by the bolt 2 when it is introduced into the sleeve 5, and substantially surrounds the circumference of the sleeve 5.

The adhesive 3 is preferably a construction adhesive, such as a polymerizing system. Typical systems include the free radical polymerization of unsaturated polyester resins, the free radical polymerization of acrylates, and the free radical polymerization of epoxyacrylates. The adhesive 3 can be a vinyl ester, an acrylic, an epoxy, a polyester, resin, grout, cement mortar or any other adhesive system which can be placed into the sleeve 5, allow for the insertion of the sleeve 5 filled with the adhesive system 3 to be inserted into the bore 4 or apertures 4 and 34, allow for an anchor or fastener 2 to be positioned in the sleeve 5, and then harden or set-up to bond the anchor 2 with the substrate 1.

The adhesive 3 is preferably a two-part adhesive, the first part consisting primarily of one or more polymerizable monomers or compounds, and the second part consisting of an initiator or other hardening agent. The components are stored separately, and when mixed the adhesive 3 sets. Preferably, the adhesive 3 is stored separately and then mixed just before insertion into the sleeve 5. A preferred means of accomplishing this is using a two-part container that can be loaded into an injection gun. The container has a static mixing nozzle where the components are mixed as they are extruded from the container by the piston of the mixing gun, with the mixed components be inserted immediately upon mixing into the sleeve 5.

The container could also have means for mixing the components in the container such as a rupturable or frangible barrier between the components that can be broken when the components are ready to be mixed such as by a impeller that would then help mix the components.

The components of the adhesive 3 could also be stored in a flexible casing that could be inserted into the sleeve 5. The casing and the barrier between the two components could be broken by the anchor 2 being inserted into the sleeve 5 with rotating of the anchor 2 accomplishing the mixing, although this method is not preferred. Methods of introducing the adhesive 3 into the sleeve 5 are also known in the art where the resin is placed in the sleeve 5, and a hardener or initiator is carried on a fibrous sheath on the anchor 2, wherein, when the anchor 2 is inserted into the sleeve, the hardener on the sheath comes into contact with the resin and setting begins. In these methods the anchor 2 is rotated in the sleeve 5 to produce mixing. This method is also not preferred.

Various additives, known in the art, such as fillers, inhibitors, stabilizers, catalysts, thixotropic agents, plasticizers, pigments, and cross-linking agents can be included in the adhesive system 3, depending on its type.

For a hollow substrate, such as a a concrete masonry unit 30, the substrate is prepared by forming aligned apertures 4 and 34 in the first and second webs 31 and 33 of the hollow substrate 30. Using a drill, a first aperture 4 is formed in the first web 31 of the substrate 30. The drill is then inserted further, extending across the interior cavity 32 of the hollow substrate 30, and a second aperture 34 is blind drilled in a second opposite web 33 of the hollow substrate 30.

A substrate 1 with a large interior cavity 32 could be a hollow concrete block 30, or it could be two walls of masonry members such as rows of bricks spaced apart from each other, to name two common examples.

The bores or apertures 4 and 34 in the substrate 30, are then cleaned of debris, usually with a brush.

The preferred screen 5, formed by inserting a separately formed tube 7 into the insertion end 12 of a separately formed frame 6, and sealing the insertion end 12 of the frame with a plug 23, is then completely filled with an adhesive 3 through the trailing end or proximal end 15. An injection gun is typically used for this filling procedure, and the screen 5 can be filled with a cap 39 having an opening for receiving the nozzle 41 of an injection gun in place if desired. See FIGS. 8C and 8D.

The apertures 16 in the mesh tube 7 and the apertures 19 in the trailing axial section 18 in the frame 6 are of a selected size with respect to the adhesive 3 selected so that the adhesive 3 does not come too far out of the apertures 16 and 19.

After the screen 5 has been filled with adhesive 3, it is inserted, distal end first 12, through the first aperture 4 within the web 31, across the hollow interior 32 of the hollow substrate 30, and into the second aperture 34 in the second web 33.

The fastener or anchor 2 is inserted into the screen 5 so as to exert ram pressure on the adhesive mass 3 and extrude the adhesive or mortar 3 out of the apertures 14, 16 and 19 of the screen 5 (the larger openings 14 in the leading axial section 13 of the frame 6, the apertures 19 in the trailing axial section 18 of the frame 6, and the apertures 16 in the mesh tube 7) to bond with the substrate 30 and secure the bolt 2 thereto upon setting. The skirt or flaps 40 on the end cap 39 help to keep mortar or adhesive 3 from extruding out the trailing end of the sleeve 15, and they also help center the anchor 2 in the sleeve 5.

Where the cavity 32 in the substrate 30 interfaces with the aperture or bore 4, a positive lock will be afforded by the hardenable mass or adhesive 3 spreading along the web 31 into the cavity 32 in the substrate 30 and then setting.

Depending on the orientation of the anchor 2, and particularly if the anchor 2 is set in a ceiling or roof, the anchor or fastener 2 will need to be held in place while the adhesive 3 sets and hardens.

The screen 5 can also be used for bonding an anchor 2 to just the outer shell or first web 31 of a hollow wall 30. The installation is similar to that described above. The inventors have tested the inventive screen 5 in a 10" hollow concrete masonry unit 30, bonding the anchor to only the outer shell 31 of the concrete masonry unit 30 in the center of the shell or web 31.

Using a drill with a ⁹⁄₁₆" drill bit, a first aperture 4 was formed in the first web 31 of the concrete masonry unit 30. The aperture was then cleaned of debris.

A 3.5" long screen 5 formed according to the preferred embodiment of the present invention was selected. The internal diameter 28 of the frame was 0.475". The mesh tube 7 had an outside diameter 27 of approximately 0.470", a length of 2.45" and a thickness of 0.020".

The screen 5 was completely filled with an acrylic-based adhesive sold under the brand Acrylic-Tie™ through the trailing end or proximal end 15 of the frame 6. After the screen 5 was filled with adhesive 3, it was inserted, distal end first 12, through the first aperture 4 within the outer shell or web 31 of the hollow concrete block 30 which was approximately 1.7" thick.

A ⅜" diameter Grade B7 All Thread Rod anchor 3 was inserted into the screen 5 so as to exert ram pressure on the adhesive mass 3 and extrude the adhesive 3 out of the apertures apertures 14, 16 and 19 of the screen 5 (the larger openings 14 in the leading axial section 13 of the frame 6, the apertures 19 in the trailing axial section 18 of the frame 6, and the apertures 16 in the mesh tube 7) to bond with the substrate 30 and secure the bolt 2 thereto upon setting.

The screen can also be used in a solid substrate 1. A bore 4 is drilled a selected depth in the solid substrate, and otherwise the installation is similar to that described above and is not repeated.

We claim:

1. A connection comprising:

a. a substrate having a bore therein;

b. a sleeve received by the bore, the sleeve being formed from two distinct and separately formed members that are assembled together to create the sleeve, the first member being a frame, defining an interior area enclosed by the frame and an exterior area, the frame comprising an insertion end, a first axial section, and an anchor receiving end, the first axial section having openings formed therein, the second member being a tube having apertures formed therein, the tube being received by the frame, such that at least a portion of the tube overlaps a portion of the first axial section, such that a material disposed within the interior area enclosed by frame and at the first axial section, if forced radially outwardly, would pass through the apertures in the tube, and through the openings in the frame to reach the exterior of the frame;

c. an adhesive disposed within the interior area of the frame and along portions of the exterior area of the frame, and in contact with the substrate;

d. an anchor received by the frame and having a portion received within the interior area of the frame and in contact with the adhesive in the interior of the frame, the adhesive substantially surrounding and contacting the portion of the anchor received within the interior of the frame.

2. The connection of claim 1, wherein the frame further comprises:

a second axial section having openings formed therein.

3. The connection of claim 2, wherein:

the openings formed in the second axial section are of a different size than the openings formed in the first axial section.

4. The connection of claim 3, wherein:

the openings formed in the second axial section are larger than the apertures in the tube.

5. The connection of claim 1, wherein:

the insertion end of the frame is substantially closed so that the adhesive in the interior of the frame cannot pass through the insertion end of the frame to reach the exterior of the frame.

6. The connection of claim 1, wherein the first axial section of the frame comprises:

a plurality of spaced-apart staves joined together by ribs, creating the openings in the first axial section.

7. The connection of claim 6, wherein:

the ribs are preferably annular hoops.

8. The connection of claim 1, wherein:

the apertures in the tube are smaller than the openings in the first axial section of the frame.

9. The connection of claim 1, wherein:
the tube is of similar length as the first axial section of the frame.

10. The connection of claim 1, wherein:
the frame is formed with an abutment at said anchor receiving end.

11. The connection of claim 1, wherein:
the frame and the tube are cylindrical members.

12. The connection of claim 1, further comprising:
a cap attached to the anchor receiving end of the frame.

13. The connection of claim 12, wherein:
the cap is formed with resilient flaps that allow the anchor to be inserted through the cap when the cap is a placed over the anchor receiving end of the frame.

14. A method for making a connection between an anchor and a substrate, comprising:
   a. creating an apertured screen by inserting a separately formed tube, the tube having apertures formed therein, into a separately formed frame, the frame comprising an insertion end, a first axial section, and an anchor receiving end, and the first axial section having openings therein, the tube being inserted into the frame in such a manner that the apertures in the tube overlap with the openings in the first axial section of the frame,
   b. filling the screen with an adhesive;
   c. inserting the screen into a bore in the substrate;
   d. inserting the anchor into the screen after the screen has been filled with adhesive and after the screen has been inserted into the bore, such that the adhesive is extruded out of the screen through the apertures in the separately formed tube and the openings in the separately formed frame, such that the adhesive contacts the substrate, and such that a portion of the anchor is received within the frame and the adhesive substantially surrounds and contacts the portion of the anchor received within the interior of the frame.

15. The method of claim 14, wherein the frame further comprises:
a second axial section having openings formed therein.

16. The method of claim 15, wherein:
the openings formed in the second axial section are of a different size than the openings formed in the first axial section.

17. The method of claim 16, wherein:
the openings formed in the second axial section are larger than the apertures in the tube.

18. The method of claim 14, wherein:
the insertion end of the frame is substantially closed so that the adhesive in the interior of the frame cannot pass through the insertion end of the frame to reach the exterior of the frame.

19. The method of claim 14, wherein the first axial section of the frame comprises:
a plurality of spaced-apart staves joined together by ribs, creating the openings in the first axial section.

20. The method of claim 19, wherein:
the ribs are preferably annular hoops.

21. The method of claim 14, wherein:
the apertures in the tube are smaller than the openings in the first axial section of the frame.

22. The method of claim 14, wherein:
the tube is of similar length as the first axial section of the frame.

23. The method of claim 14, wherein:
the frame is formed with an abutment at said anchor receiving end.

24. The method of claim 14, wherein:
the frame and the tube are cylindrical members.

25. The method of claim 14, further comprising:
a cap attached to the anchor receiving end of the frame.

26. The method of claim 25, wherein:
the cap is formed with resilient flaps that allow the anchor to be inserted through the cap when the cap is a placed over the anchor receiving end of the frame.

27. The connection of claim 4, wherein:
the apertures in the tube are smaller than the openings in the first axial section of the frame.

28. The connection of claim 27, further comprising:
a cap attached to the anchor receiving end of the frame.

29. The connection of claim 28, wherein:
the cap is formed with resilient flaps that allow the anchor to be inserted through the cap when the cap is a placed over the anchor receiving end of the frame.

30. The method of claim 17, wherein:
the apertures in the tube are smaller than the openings in the first axial section of the frame.

31. The method of claim 30, further comprising:
a cap attached to the anchor receiving end of the frame.

32. The method of claim 31, wherein:
the cap is formed with resilient flaps that allow the anchor to be inserted through the cap when the cap is a placed over the anchor receiving end of the frame.

33. The connection of claim 2, wherein:
the first and second axial sections of the frame are formed such that if the anchor is inserted into the frame, the adhesive is radially extruded through the first and second axial sections at different rates.

34. The method of claim 15, wherein:
the first and second axial sections of the frame are formed such that when the anchor is inserted into the frame, the adhesive is radially extruded through the first and second axial sections at different rates.

35. A connection comprising:
   a. a substrate having a bore therein;
   b. a sleeve received by the bore, the sleeve being formed from two distinct and separately formed members that are assembled together to create the sleeve, the first member being a frame, defining an interior area enclosed by the frame and an exterior area, the frame comprising an insertion end, a first axial section, a second axial section, and an anchor receiving end, the first axial section having openings formed therein, the second axial section having openings formed therein, the second member being a tube, the tube being received by the frame, such that at least a portion of the tube overlaps a portion of the first axial section;
   c. an adhesive disposed within the interior area of the frame and along portions of the exterior area of the frame, and in contact with the substrate;
   d. an anchor received by the frame and having a portion received within the interior area of the frame and in contact with the adhesive in the interior of the frame, the adhesive substantially surrounding and contacting the portion of the anchor received within the interior of the frame.

* * * * *